US010395263B2

(12) United States Patent
Kamhi et al.

(10) Patent No.: US 10,395,263 B2
(45) Date of Patent: Aug. 27, 2019

(54) INTERESTINGNESS SCORING OF AREAS OF INTEREST INCLUDED IN A DISPLAY ELEMENT

(75) Inventors: Gila Kamhi, Zichron Yaakov (IL); Barak Hurwitz, Kibbutz Alonim (IL); Yosi Govezensky, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 599 days.

(21) Appl. No.: 13/976,949

(22) PCT Filed: Dec. 12, 2011

(86) PCT No.: PCT/US2011/064439

§ 371 (c)(1),
(2), (4) Date: Aug. 12, 2014

(87) PCT Pub. No.: WO2013/089667

PCT Pub. Date: Jun. 20, 2013

(65) Prior Publication Data

US 2014/0344012 A1 Nov. 20, 2014

(51) Int. Cl.
*G06Q 30/02* (2012.01)
*G06F 3/00* (2006.01)
*G06F 3/01* (2006.01)

(52) U.S. Cl.
CPC ......... *G06Q 30/0202* (2013.01); *G06F 3/005* (2013.01); *G06F 3/013* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 8,214,909 B2 * | 7/2012 | Morita | H04N 1/00408 726/2 |
| 8,996,510 B2 * | 3/2015 | Karmarkar | G06F 16/95 707/722 |
| 2005/0243054 A1 | 11/2005 | Beymer et al. | |
| 2006/0109237 A1 | 5/2006 | Morita et al. | |
| 2006/0112031 A1 | 5/2006 | Ma et al. | |
| 2008/0091549 A1 * | 4/2008 | Chang | G06Q 30/02 705/14.66 |
| 2010/0004977 A1 * | 1/2010 | Marci | G06Q 10/10 705/7.32 |

(Continued)

FOREIGN PATENT DOCUMENTS

| | | |
|---|---|---|
| CN | 102221881 | 10/2011 |
| CN | 102254151 | 11/2011 |

OTHER PUBLICATIONS

Office Action and Search Report received for Chinese Patent Application No. 201180075458.8, dated Feb. 26, 2016, 7 pages (untranslated).

(Continued)

*Primary Examiner* — Alan S Miller
*Assistant Examiner* — Arif Ullah

(57) ABSTRACT

Examples are disclosed for determining an interestingness score for one or more areas of interest included in a display element such as a static image or a motion video. In some examples, an interestingness score may be determined based on eye tracking or gaze information gathered while an observer views the display element.

19 Claims, 10 Drawing Sheets

Display Element 300

(56) References Cited

U.S. PATENT DOCUMENTS

| | | | | |
|---|---|---|---|---|
| 2010/0207877 | A1 | 8/2010 | Woodard | |
| 2011/0035674 | A1 | 2/2011 | Chenoweth et al. | |
| 2011/0205148 | A1 | 8/2011 | Corriveau et al. | |
| 2012/0324494 | A1* | 12/2012 | Burger | H04H 60/33<br>725/12 |
| 2013/0054622 | A1* | 2/2013 | Karmarkar | G06F 16/951<br>707/749 |

OTHER PUBLICATIONS

International Search Report and Written Opinion, dated Jul. 31, 2012, Application No. PCT/US2011/064439, Filed Date: Dec. 12, 2011, pp. 8.

* cited by examiner

FIG. 3
Display Element 300
Area of Interest 310
Area of Interest 320
Area of Interest 330
Area of Interest 340
Area of Interest 350
Area of Interest 360
Area of Interest 370

Scoring Criteria Table 700

| Criteria | Gaze Duration | Gaze Count | Time to 1st Fixation | Fixation Count |
|---|---|---|---|---|
| < 1 | 25 | 25 | 100 | 25 |
| 1-2 | 50 | 50 | 75 | 50 |
| 3-5 | 75 | 75 | 50 | 75 |
| > 5 | 100 | 100 | 25 | 100 |

FIG. 7

Display Element Scoring Table 800

| | Gaze Duration | | Gaze Count | | Time to 1st Fixation | | Fixation Count | | Interestingness Score |
|---|---|---|---|---|---|---|---|---|---|
| ID | Observed (sec.) | Score | Observed | Score | Observed (sec.) | Score | Observed | Score | |
| 310 | 2 | 50 | 1 | 25 | 5 | 25 | 2 | 50 | 37.5 |
| 320 | 1 | 25 | 1 | 25 | 6 | 25 | 1 | 25 | 25 |
| 330 | 3 | 75 | 2 | 50 | 4 | 50 | 3 | 75 | 62.5 |
| 340 | 3 | 75 | 3 | 75 | 2 | 75 | 7 | 100 | 81.25 |
| 350 | 4 | 75 | 3 | 75 | 3 | 50 | 4 | 75 | 68.75 |
| 360 | 7 | 100 | 4 | 75 | 1 | 100 | 6 | 100 | 93.75 |
| 370 | 2 | 50 | 3 | 75 | 7 | 25 | 6 | 100 | 62.5 |

FIG. 8

INTERESTINGNESS SCORING OF AREAS OF INTEREST INCLUDED IN A DISPLAY ELEMENT

BACKGROUND

Display elements such as static digital images or frames of motion video may include a richness of observable content. An observer, for example, may gaze or fixate on various portions or areas of interest when viewing a display element. The observer's gaze or fixation on the areas of interest may provide useful information that may characterize the observer's interests. Also, when combined with information obtained from viewing a multitude of display elements having similar areas of interest, a more detailed characterization of the observer's interests may be provided.

BRIEF DESCRIPTION OF THE DRAWINGS

FIG. 7 illustrates an example scoring criteria table.

FIG. 8 illustrates an example display element scoring table.

DETAILED DESCRIPTION

As contemplated in the present disclosure, an observer's gaze or fixation on areas of interest associated with a display element may provide useful information to possibly characterize the observer's interests. Display elements may be a type of digital media that includes static images or motion video. Display elements are often observed via a monitor or flat screen coupled to a computing device. Also, social media websites may allow people to observe and share large numbers of digital media files or display elements. Advertisers may also wish to place display elements before targeted consumers to advertise consumer goods or gather marketing information. Measuring an observer's interest in particular areas of a display element (herein referred to as "interestingness") may provide useful information that could be used by social media sites to link the observer with others having similar interests or may provide advertisers with valuable marketing information.

In some examples, techniques are implemented for determining an interestingness score. For these examples, a processor circuit may receive information identifying one or more areas of interest included in a display element to be displayed to an observer. Gaze information for a user may be gathered based on tracking the observer's eyes as the display element is displayed. An interestingness score may then be determined for the one or more areas of interest based on the gathered eye tracking information.

Figure 1:
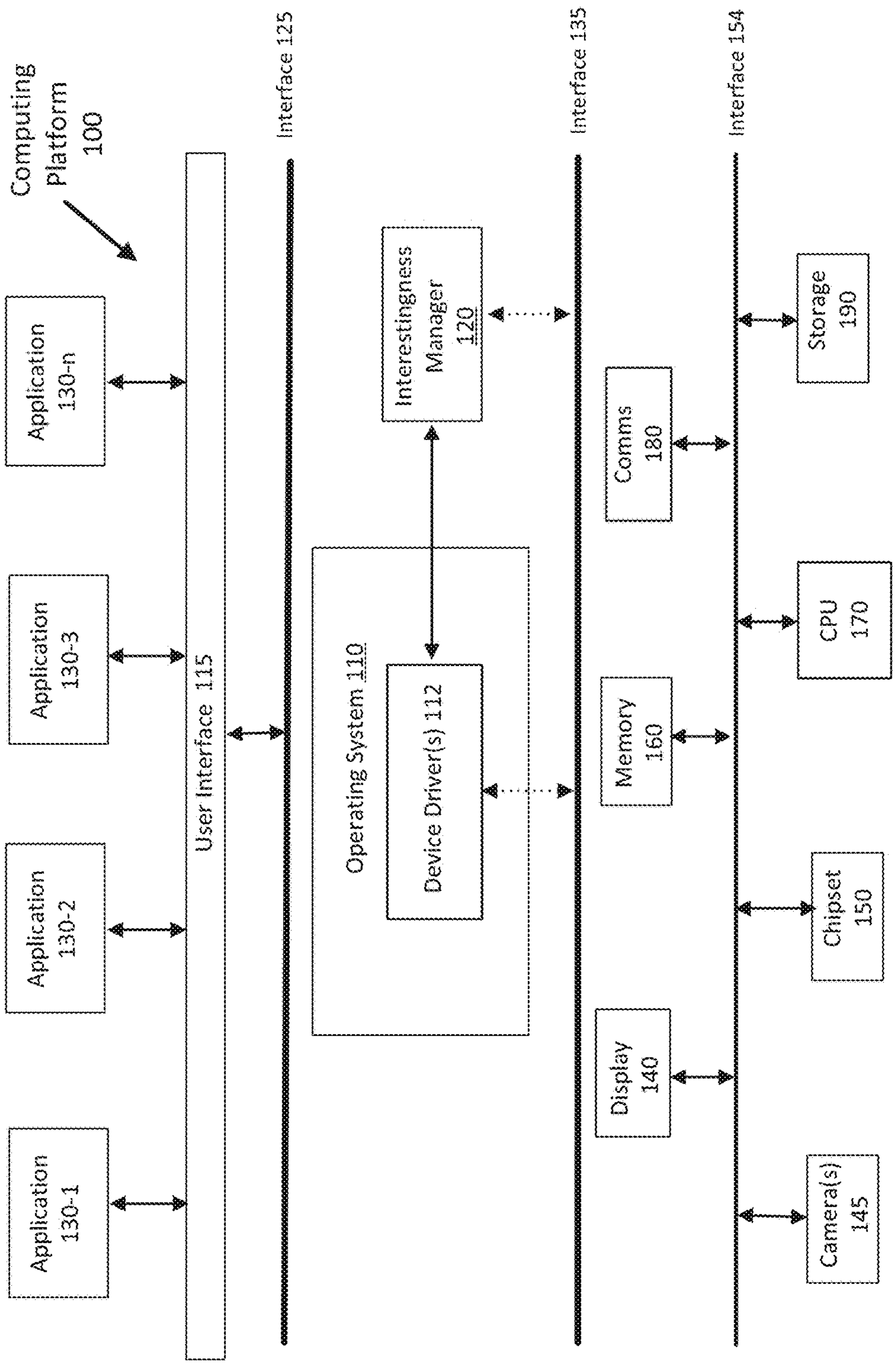
FIG. 1 illustrates an example computing platform.

FIG. 1 illustrates an example computing platform 100. As shown in FIG. 1, computing platform 100 includes an operating system 110, an interestingness manager 120, applications 130-1 to 130-n, a display 140, camera(s) 145, a chipset 150, a memory 160, a central processing unit (CPU) 170, a communications (comms) 180 and storage 190. According to some examples, several interfaces are also depicted in FIG. 1 for interconnecting and/or communicatively coupling elements of computing platform 100. For example, user interface 115 and interface 125 may allow for users (not shown) and/or applications 130-1 to 130-n to couple to operating system 110. Also, interface 135 may allow for interestingness manager 120 or elements of operating system 110 (e.g., device driver(s) 112) to communicatively couple to elements of computing platform 100 such as display 140, camera(s) 145, memory 160, CPU 170 or comms 180. Interface 154, for example, may allow hardware and/or firmware elements of computing platform 100 to communicatively couple together, e.g., via a system bus or other type of internal communication channel.

In some examples, as shown in FIG. 1, applications 130-1 to 130-n (where "n" may be any whole number greater than 3) may include applications associated with, but not limited to, an advertiser, a social media Internet site, digital photo sharing or digital video sharing. For these examples, as described more below, applications 130-1 to 130-n may provide information identifying one or more areas of interest included in a display element to be displayed to an observer (e.g., on display 145).

According to some examples, as shown in FIG. 1, operating system 110 may include device driver(s) 112. Device driver(s) 112 may include logic and/or features configured to interact with hardware/firmware type elements of computing platform 100 (e.g., via interface 135). For example, device driver(s) 112 may include device drivers to control camera(s) 145 or display 140. Device driver(s) 112 may also interact with interestingness manager 120 to perhaps relay information gathered from the camera(s) 145 while an observer views a display element on display 140.

In some examples, as described more below, interestingness manager 120 may include logic and/or features configured to receive information (e.g., from applications 130-1 to 130-n). The information may include one or more areas of interest (e.g., tags) included in a display element. Interestingness manager 120 may gather eye tracking or gaze information obtained from camera(s) 145 while an observer views the display element on display 140. Interestingness manager 120 may then use various criteria (e.g., gaze duration, gaze counts, fixation counts, time to first fixation, etc.) to determine an interestingness score for the one or more areas of interest.

In some examples, chipset 150 may provide intercommunication among operating system 110, display 140, camera(s) 145, memory 160, CPU 170, comms 180 or storage 190.

According to some examples, memory 160 may be implemented as a volatile memory device utilized by various elements of computing platform 100 (e.g., as off-chip memory). For these implementations, memory 150 may include, but is not limited to, random access memory (RAM), dynamic random access memory (DRAM) or static RAM (SRAM).

According to some examples, CPU 170 may be implemented as a central processing unit for computing platform 100. CPU 170 may include one or more processing units having one or more processor cores or having any number of processors having any number of processor cores. CPU 170 may include any type of processing unit, such as, for example, a multi-processing unit, a reduced instruction set computer (RISC), a processor having a pipeline, a complex instruction set computer (CISC), digital signal processor (DSP), and so forth.

In some examples, comms 180 may include logic and/or features to enable computing platform 100 to communicate externally with elements remote to computing platform 100. These logic and/or features may include communicating over wired and/or wireless communication channels via one or more wired or wireless networks. In communicating across such networks, comms 180 may operate in accordance with one or more applicable communication or networking standards in any version.

In some examples, storage 190 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device.

As mentioned above, interface 154, may allow hardware and/or firmware elements of computing platform 100 to communicatively couple together. According to some examples, communication channels interface 154 may operate in accordance with one or more protocols or standards. These protocols or standards may be described in one or one or more industry standards (including progenies and variants) such as those associated with the Inter-Integrated Circuit ($I^2C$) specification, the System Management Bus (SMBus) specification, the Accelerated Graphics Port (AGP) specification, the Peripheral Component Interconnect Express (PCI Express) specification, the Universal Serial Bus (USB), specification or the Serial Advanced Technology Attachment (SATA) specification. Although this disclosure is not limited to only the above-mentioned standards and associated protocols.

Figure 2:
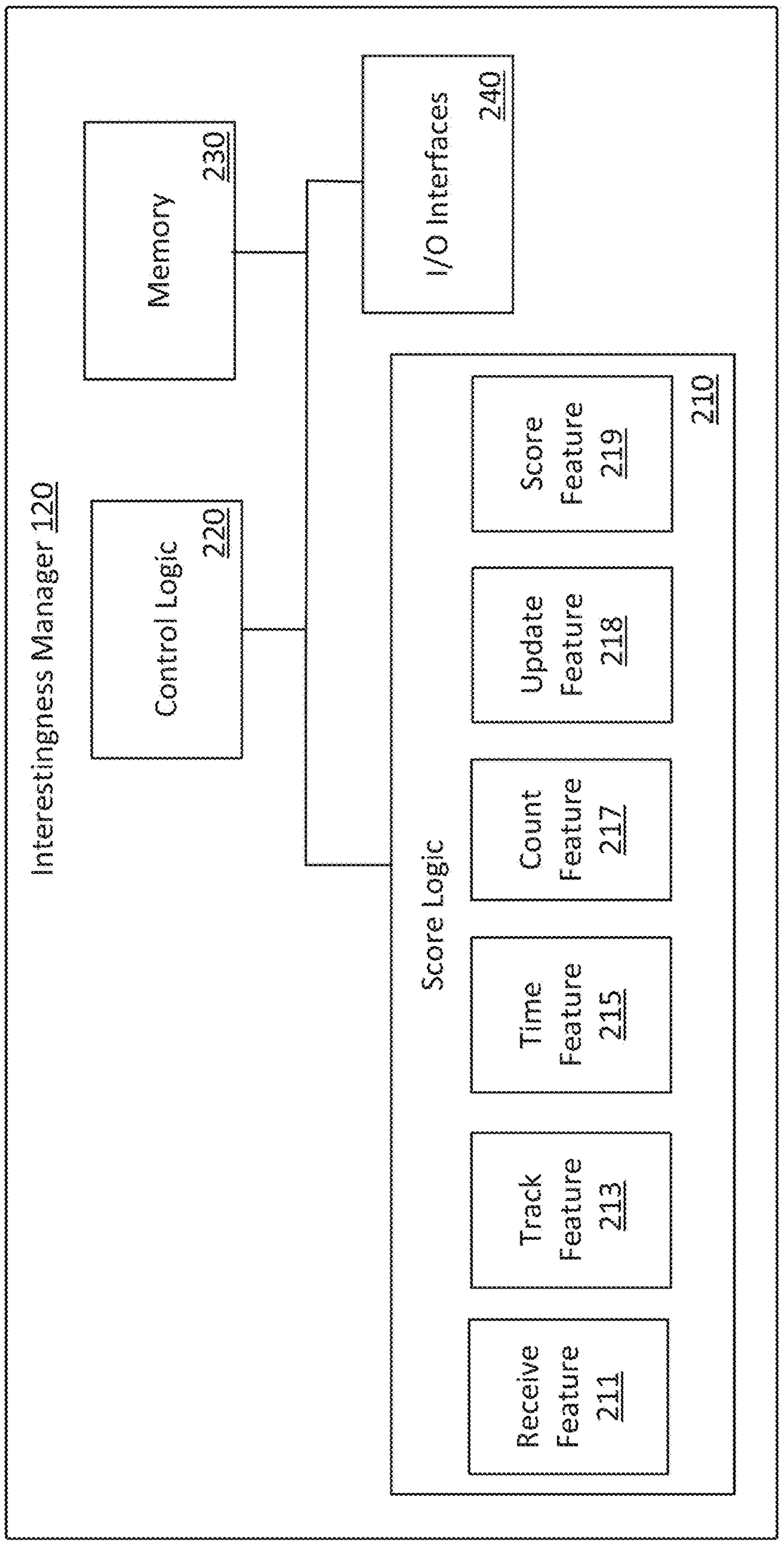
FIG. 2 illustrates a block diagram of an example architecture for an interestingness manager.

In some examples, computing platform 100 may be at least part of a computing device. Examples of a computing device may include a personal computer (PC), laptop computer, ultra-mobile laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth FIG. 2 illustrates a block diagram of an example architecture for interestingness manager 120. In some examples, interestingness manager 120 includes features and/or logic configured or arranged to determine an interestingness score for one or more areas of interest included in a display element to be displayed to an observer.

According to some examples, as shown in FIG. 2, interestingness manager 120 includes score logic 210, control logic 220, a memory 230 and input/output (I/O) interfaces 240. As illustrated in FIG. 2, score logic 210 may be coupled to control logic 220, memory 230 and I/O interfaces 240. Score logic 210 may include one or more of a receive feature 211, a track feature 213, a time feature 215, a count feature 217, an update feature 218 or a score feature 219, or any reasonable combination thereof.

In some examples, the elements portrayed in FIG. 2 are configured to support or enable interestingness manager 120 as described in this disclosure. A given interestingness manager 120 may include some, all or more elements than those depicted in FIG. 2. For example, score logic 210 and control logic 220 may separately or collectively represent a wide variety of logic device(s) or executable content to implement the features of interestingness manager 120. Example logic devices may include one or more of a microprocessor, a microcontroller, a processor circuit, a field programmable gate array (FPGA), an application specific integrated circuit (ASIC), a sequestered thread or a core of a multi-core/multi-threaded microprocessor or a combination thereof.

In some examples, as shown in FIG. 2, score logic 210 includes receive feature 211, track feature 213, time feature 215, count feature 217, update feature 218 or score feature 219. Score logic 210 may be configured to use one or more of these features to perform operations. For example, receive feature 211 may receive information identifying one or more areas of interest included in a display element (e.g., from an application). Track feature 213 may gather eye tracking or gaze information obtained from an eye tracking system that may include one or more cameras that captured eye movement information while an observer viewed the display element. Time feature 215 may determine gaze and time to first fixation based on the gathered eye tracking information. Count feature 217 may determine gaze and fixation counts based on the gathered eye tracking or gazes information. Score feature 219 may then determine separate interestingness scores for the one or more areas of interest based on the gathered eye tracking or gaze information. Also, update feature 218 may update a profile associated with the observer based on one or more of the separately determined interestingness scores.

In some examples, control logic 220 may be configured to control the overall operation of interestingness manager 120. As mentioned above, control logic 220 may represent any of a wide variety of logic device(s) or executable content. For some examples, control logic 220 may be configured to operate in conjunction with executable content or instructions to implement the control of interestingness manager 120. In some alternate examples, the features and functionality of control logic 220 may be implemented within score logic 210.

According to some examples, memory 230 may be arranged to store executable content or instructions for use by control logic 220 and/or score logic 210. The executable content or instructions may be used to implement or activate features or elements of interestingness manager 120. As described more below, memory 230 may also be arranged to at least temporarily maintain information associated with one or more areas of interest for a display element or information associated with gathered eye tracking or gaze information. Memory 230 may also at least temporarily maintain scoring criteria or display element scoring tables used to determine an interestingness score for the one or more areas of interest.

Memory 230 may include a wide variety of memory media including, but not limited to, one or more of volatile memory, non-volatile memory, flash memory, programmable variables or states, RAM, ROM, or other static or dynamic storage media.

In some examples, I/O interfaces 240 may provide an interface via a local communication medium or link between interestingness manager 120 and elements of computing platform 100 depicted in FIG. 1. I/O interfaces 240 may include interfaces that operate according to various communication protocols to communicate over the local communication medium or link (e.g., $I^2C$, SMBus, AGP, PCI Express, USB, SATA, etc).

Figure 3:
FIG. 3 illustrates an example display element as a static image.

FIG. 3 illustrates an example display element 300 as a static image. In some examples, display element 300 may be viewed by an observer. For these examples, display element 300 may include areas of interest that are shown in FIG. 3 as areas of interest 310 to 370. As shown in FIG. 3 these areas of interest are depicted as having white boxes surrounding a given area of interest.

According to some examples, areas of interest may represent tagged objects. These tagged objects may include, but are not limited to an identified person, a type of person (e.g., man, woman, child, baby, athlete, soldier, policeman, fireman, etc.), a type of consumer product, a type of flora, a type of fauna, a type of structure, a type of landscape or a color. For example, areas of interest 330, 350 and 360 include people and may be associated with tags identifying a person or a type of person. Areas of interest 320 and 370 include trees and vines and may be associated with types of flora. Area of interest 340 includes a wine glass and may be associated with a consumer product such as wine or glassware. Also, area of interest 310 includes hills or mountains and may be associated with a type of landscape.

In some examples, an application from among applications 130-1 to 130-n may provide information identifying one or more of the areas of interest for display element 300 to an interestingness manager 120. For example, an application associated with an advertiser, a social media Internet site, digital photo sharing or digital video sharing may provide information to identify at least some of the areas of interest from among areas of interest 310 to 370.

Figure 4:
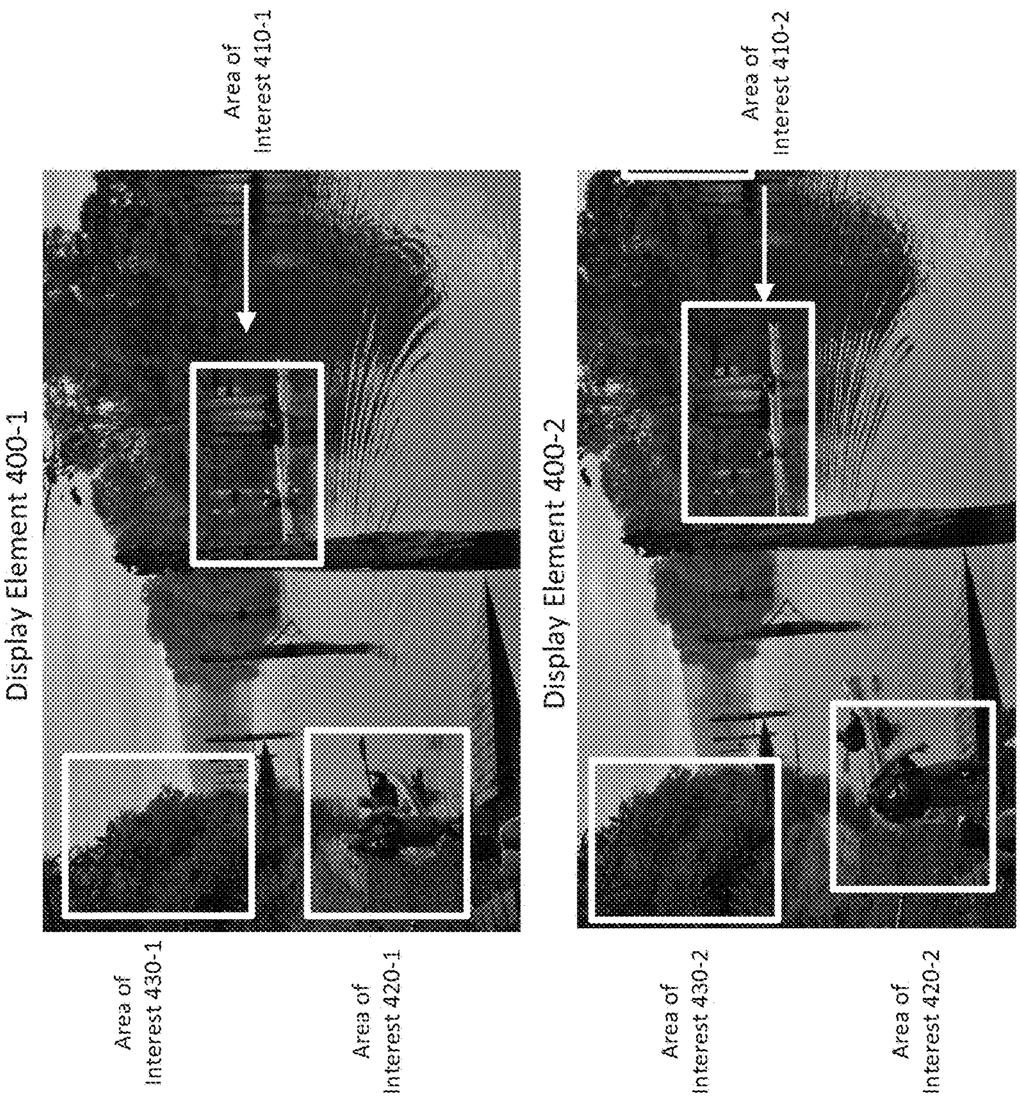
FIG. 4 illustrates example display elements as frames from a motion video.

FIG. 4 illustrates example display elements 400-1 and 400-2 from a motion video. In some examples, display elements 400-1 and 400-2 may be individual frames from a motion video to be viewed by an observer. For these examples, display element 400-1 may include areas of interest that are shown in FIG. 4 as areas of interest 410-1 to 430-1. Also, display element 400-2 may include areas of interest that are shown in FIG. 4 as areas of interest 410-2 to 430-2. Similar to the areas of interest shown in FIG. 3, the areas of interest in FIG. 4 are depicted as having white boxes surrounding a given area of interest.

In some examples, areas of interest for a motion video may include areas that may be fixed such as the flora included in area of interest 430-1 and 430-2. For these examples, other areas of interest for the motion video may include areas that are in motion such as the kayak and person included in areas of interest 420-1 and 420-2. Also, for these examples, the actual video capture device may be fixed for at least a period of time such that the flora remains in the upper left corner of individual frames of the motion video and other objects may move in, out or around a sequence of individual frames.

In some examples, similar to display element 300, an application from among applications 130-1 to 130-n may provide information identifying one or more of the areas of interest for display elements 400-1 and 400-2 to an interestingness manager 120.

Figure 5:
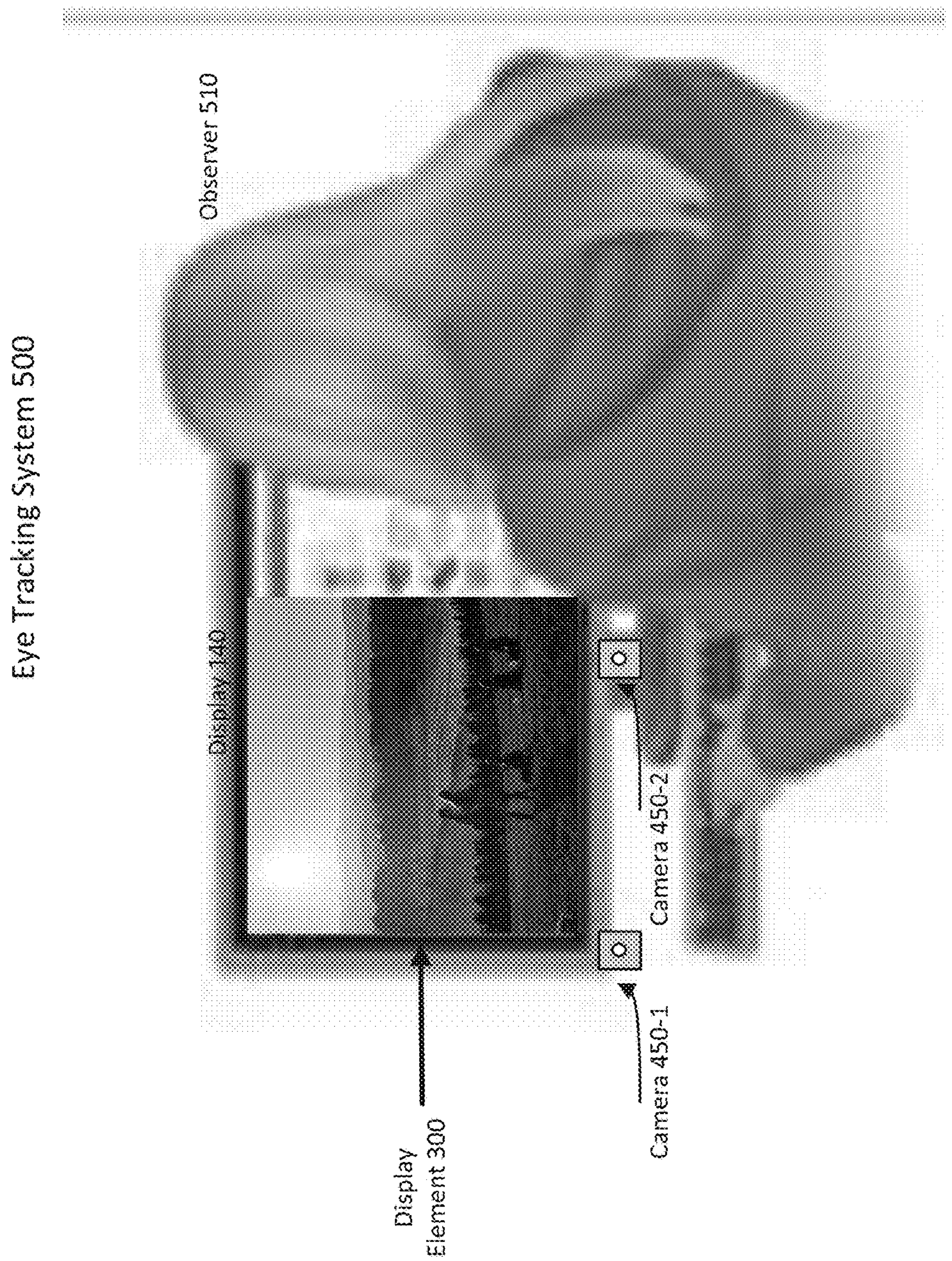
FIG. 5 illustrates an example eye tracking system.

FIG. 5 illustrates an example eye tracking system 500. In some examples, as shown in FIG. 5, cameras 145-1 and 145-2 may be positioned on display 140. For these examples, display element 300 may be displayed to observer 510 on display 140. Cameras 145-1 and 145-2 may be configured to obtain eye tracking or gaze information as observer 510 views display element 300. Interestingness manager 120 may include logic and/or features to gather the eye tracking or gaze information. As described more below, interestingness manager 120 may use the eye tracking or gaze information to determine interestingness scores for areas of interest 310 to 370

Figure 6:
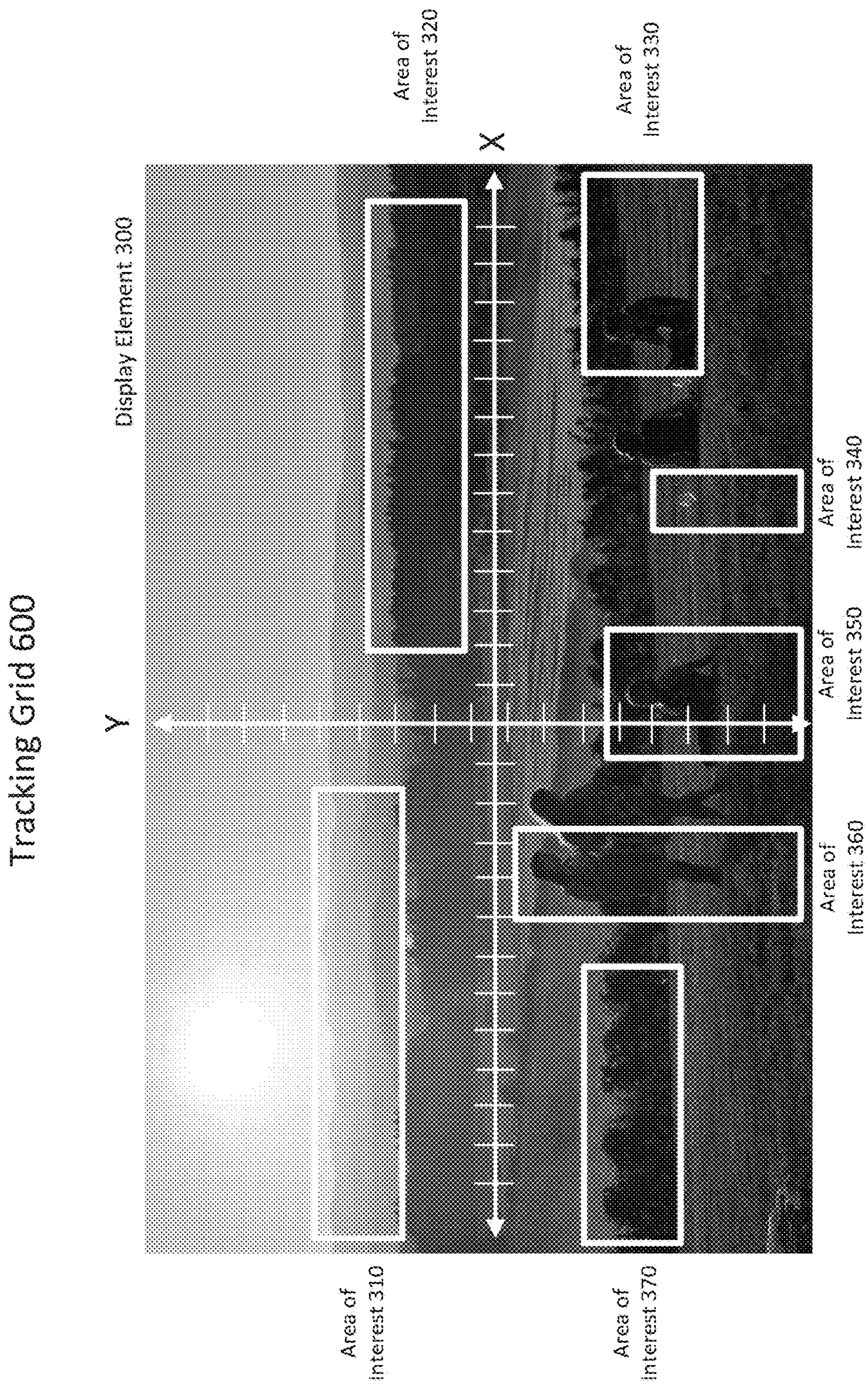
FIG. 6 illustrates an example tracking grid for a display element.

FIG. 6 illustrates an example tracking grid 600 for display element 300. In some examples, as shown in FIG. 6, an X/Y grid system may be established to identify areas on display element 300 when observed by observer 510. For these examples, cameras 145-1 and 145-2 may be configured to track observer 510's eyes or gaze as display element 300 is being viewed or observed. Cameras 145-1 and 145-2 may capture grid coordinates based on tracking grid 600. Cameras 145-1 and 145-2 and/or interestingness manager 120 may also be configured to timestamp the beginning time and ending time the observer's eyes gaze at or fixate on grid coordinates that correspond to areas of interest 310 to 370. As described more below, interestingness manager 120 may include logic and/or features to gather the grid coordinates and timestamps and determine an interestingness score for areas of interest 310 to 370 based on this gathered eye tracking information.

According to some examples, interestingness manager 120 may include logic and/or features configured to use the eye tracking or gaze information to determine for each of the areas of interest, separate gaze durations, separate counts of gazes, separate times to first fixation or fixation counts. In some examples, gaze duration may include a time threshold (e.g., 1 second) via which observer 510's eyes were directed to a given area of interest such as area of interest 360. Gaze count may include the number of separate times observer 510's eyes were directed to the area of interest 360. Time to first fixation may include a difference in time between when display element 300 was first displayed to observer 510 and when observer 510's eyes were first directed to the area of interest 360. A fixation count may include a number of separate times observer 510's eyes were directed to area of interest 360. This disclosure is not limited to basing interestingness scores on tracking information on separate gaze durations, separate counts of gazes, separate times to first fixation or fixation counts. Other eye tracking information may be used to determine interestingness scores.

FIG. 7 illustrates an example scoring criteria table 700. In some examples, as shown in FIG. 7, scoring may be based on gaze duration, gaze count, time to $1^{st}$ fixation and fixation count. Also, as shown in FIG. 7, scoring criteria may be based on number ranges from less than 1 to greater than 5 with each range having an assigned value from 25 to 100. For example, a gaze duration of 3-5 seconds, gaze count of 3-5, time to $1^{st}$ fixation of 3-5 seconds or fixation count of 3-5 would each have assigned values of 75.

FIG. 8 illustrates and example display element scoring table 800. In some examples, display element scoring table 800 may include determined interestingness scores based on eye tracking or gaze information gathered from observer 510's view of display element 300. For these examples, interestingness manager 120 may include logic and/or features configured to gather eye tracking information captured by cameras 145-1 and 145-2. The gathered eye tracking or gaze information may be used to determine gaze duration, gaze count, time to $1^{st}$ fixation and fixation count for each of areas of interest 310 to 370. Interestingness manager 120, for example, may determine separate scores for gaze duration, gaze count, time to $1^{st}$ fixation and fixation count for each of areas of interest 310 to 370 and then determine an interestingness score based on the separate scores.

In some examples, as shown in FIG. 8, the interestingness score for a given area of interest may be an average score. In other examples, some eye tracking or gaze information (e.g., gaze duration) may be weighted more heavily than other eye tracking information (e.g., gaze counts). An application that identified or provided the areas of interest in display element 300 may indicate whether to average the scores as shown in FIG. 8 or to weight the scores as mentioned for the other examples.

According to some examples, as shown in FIG. 8, interestingness scores are shown in the far right column of display element scoring table 800. For these examples, area of interest 360 has the highest interestingness score of 93.75. Meanwhile, area of interest 320 has the lowest interestingness score of 25. These interestingness scores, for example, may indicate that observer 510 is more interested in people (the tagged object in area of interest 360) than in trees (the tagged object in area of interest 320). Also, the interestingness scores shown in display element scoring table 800 may be used to update an interestingness profile associated with observer 510. The interestingness profile, for example, may be based, at least in part, on cumulative interestingness scores obtained from multiple viewings of different display elements.

In some examples, the updated interestingness profile may be provided to an application associated with a social media Internet site. For these examples, the updated interestingness profile may add to or update an account profile for observer 510 that may be accessible via the social media Internet site. In some other examples, the updated interestingness profile may be provided to an application associated with sharing or storing digital images or motion video. For these other examples, the updated interestingness profile may be used by these applications to facilitate the storing of and/or sharing of digital images or motion video by observer 510 and/or friends of observer 510.

According to some examples, areas of interest that are of the same type may have their separate interestingness scores combined. For example, areas of interest 330, 350 and 360 include tags identifying a type of person as a woman. Thus the interestingness scores for areas of interest 330, 350 and 360 of 62.5, 68.75 and 93.75, respectively, may be combined to result in an interestingness score of 75. This combined score may also be used to update the interestingness profile associated with observer 510.

Figure 9:
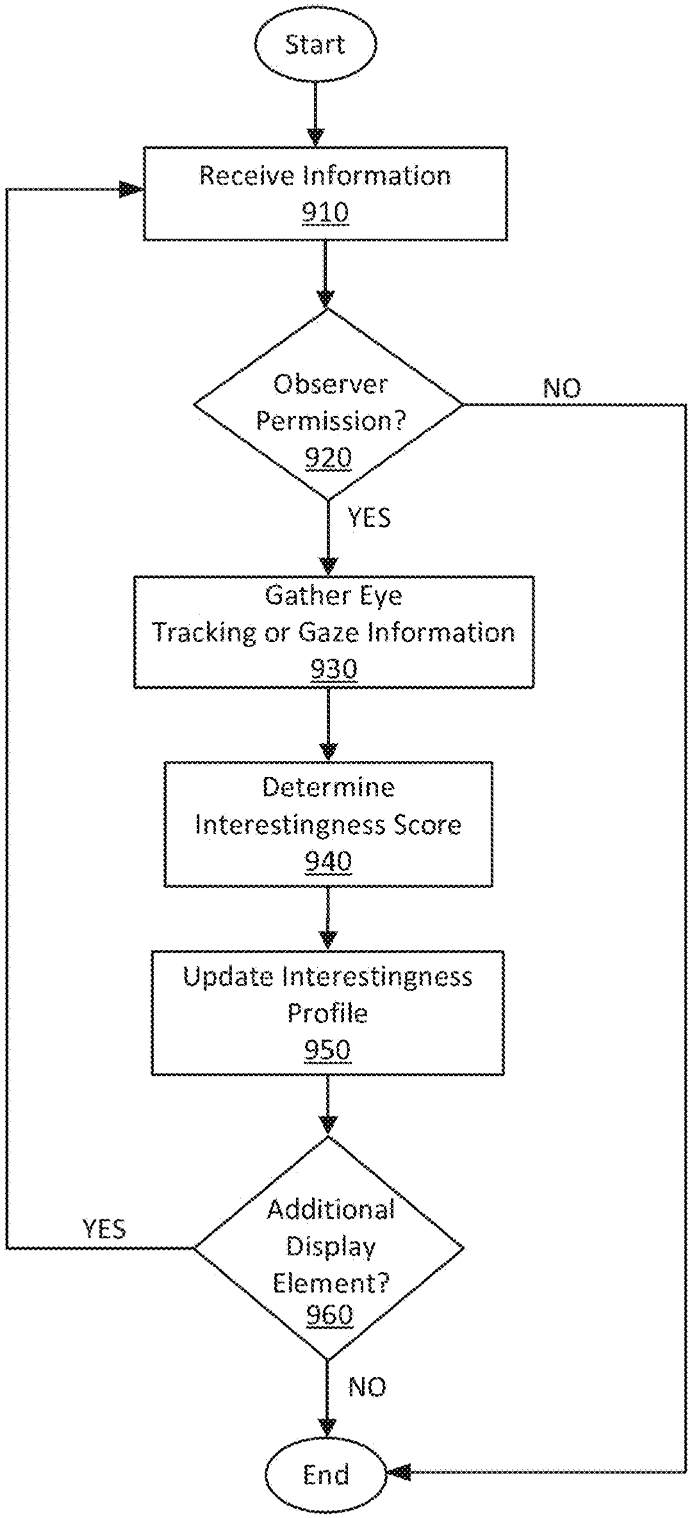
FIG. 9 illustrates a flow chart of example operations for determining an interestingness score.

FIG. 9 illustrates a flow chart of example operations for determining an interestingness score. In some examples, elements of computing platform 100 as shown in FIG. 1 may be used to illustrate example operations related to the flow chart depicted in FIG. 9. Interestingness manager 120 as shown in FIG. 1 and FIG. 2 may also be used to illustrate the example operations. But the described methods are not limited to implementations on computing platform 100 or to interestingness manager 120. Also, logic and/or features of interestingness manager 120 may build or populate tables including various scoring criteria or interestingness scores as shown in FIGS. 7 and 8. However, the example operations may also be implemented using other types of tables to indicate criteria or determine an interestingness score.

Moving from the start to block 910 (Receive Information), interestingness manager 120 may include logic and/or features configured to receive information identifying one or more areas of interest included in a display element (e.g., via receive feature 211). In some examples, the display element may be display element 300 and the one or more areas of interest may include areas of interest 310 to 370 depicted in FIG. 3. For these examples, the information may have been received from one or more applications from among applications 130-1 to 130-n. These one or more applications may include an application associated with an advertiser, a social media Internet site, digital photo sharing or motion video sharing.

Proceeding from block 910 to decision block 920 (Observer Permission?), interestingness manager 120 may include logic and/or features configured to determine whether an observer of the display element has provided permission to track the observer's eye movement (e.g., via track feature 213). In some examples, interestingness manager 120 may receive information from camera(s) 145 that the observer has opted to turn off or disable camera(s) 145. If camera(s) 145 have been turned off, interestingness manager 120 may determine that permission has not been granted and the process comes to an end. Otherwise, the process moves to block 930.

Moving from decision block 920 to block 930 (Gather Eye Tracking or Gaze Information), interestingness manager 120 may include logic and/or features configured to gather eye tracking or gaze information (e.g., via track feature 213). In some examples, interestingness manager 120 may obtain the eye tracking or gaze information from camera(s) 145 as they track the observer's eye movements or gazes and may capture grid coordinates and timestamps associated with that eye movement. For these examples, tracking grid 600 may be used to identify areas on display element 300 that the observer either gazed at or at least briefly fixated on.

According to some examples, interestingness manager 120 may include logic and/or features to use the eye tracking or gaze information to determine separate gaze durations and time to first fixation for each of the areas of interest 310 to 370 (e.g., via time feature 215). Also, interestingness manager 120 may include logic and/or features to use the eye tracking or gaze information to determine separate counts of gazes and fixations for each of the areas of interest 310 to 370 (e.g., via count feature 217). For these examples, interestingness manager 120 may include the separate gaze durations, times to first fixation, gaze counts and fixation counts in a table such as display element scoring table 800 shown in FIG. 8.

Proceeding from block 930 to block 940 (Determine Interestingness Score), interestingness manager 120 may include logic and/or features configured to determine an interestingness score (e.g., via score feature 219). In some examples, the separate gaze durations, times to first fixation, gaze counts and fixation counts for areas of interest 310 to 370 may be scored and assigned values as depicted in FIG. 8 for display element scoring table 800. For these examples, an interestingness score may be determined for a given area of interest based on an average value for gaze duration, time to first fixation, gaze count and fixation count.

Proceeding from block 940 to block 950 (Update Interestingness Profile), interestingness manager 120 may include logic and/or features to update an interestingness profile (e.g., via update feature 218) associated with the observer. In some examples, interestingness manager 120 may update the interestingness profile based on a determined interestingness score for one or more of the areas of interest 310 to 370. For these examples, the interestingness profile may be based on cumulative interestingness scores obtained from multiple viewings by the observer of different display elements.

Proceeding from block 950 to decision block 960 (Additional Display Element?), interestingness manager 120 may include logic and/or features configured to determine whether additional display element(s) are to be scored (e.g., via receive feature 211). In some examples, receipt of information indicating areas of interest for another display element may be deemed as an indication of an additional display element to be scored. If an additional display element is to be scored, the process moves to block 910. Otherwise, the process comes to an end.

Figure 10:
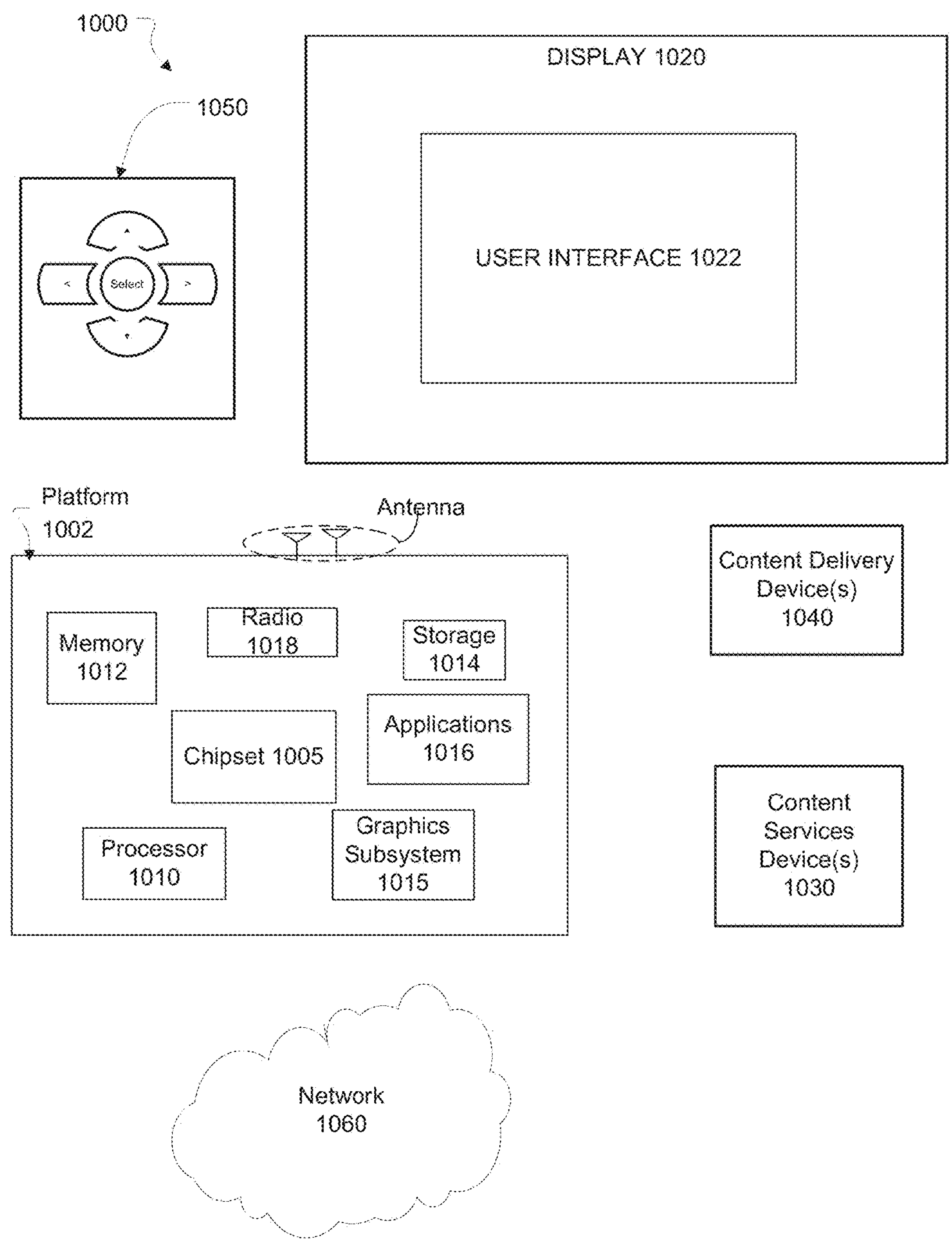
FIG. 10 illustrates an example system.

FIG. 10 illustrates an example system 1000. In some examples, system 1000 may be a media system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

According to some examples, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in more detail below.

In some examples, platform 1002 may include any combination of a chipset 1005, processor 1010, memory 1012, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as Complex Instruction Set Computer (CISC) or Reduced Instruction Set Computer (RISC) processors, x86 instruction set compatible processors, multi-core, or any other microprocessor or central processing unit (CPU). In some examples, processor 1010 may comprise dual-core processor(s), dual-core mobile processor(s), and so forth.

Memory 1012 may be implemented as a volatile memory device such as, but not limited to, a RAM, DRAM, or SRAM.

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some examples, storage 1014 may include technology to increase the storage performance enhanced protection for valuable digital media when multiple hard drives are included, for example.

Graphics subsystem 1015 may perform processing of images such as still or video for display. Similar to the graphics subsystems described above for FIG. 1, graphics subsystem 1015 may include a processor serving as a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. For some examples, graphics subsystem 1015 could be integrated into processor 1010 or chipset 1005. Graphics subsystem 1015 could also be a stand-alone card (e.g., a discrete graphics subsystem) communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another example, the graphics and/or video functions may be implemented by a general purpose processor, including a multi-core processor. In a further example, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In some examples, display 1020 may comprise any television type monitor or display. Display 1020 may include, for example, a computer display screen, touch screen display, video monitor, television-like device, and/or a television. Display 1020 may be digital and/or analog. For some examples, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

According to some examples, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In some examples, content services device(s) 1030 may comprise a cable television box, personal computer, network, telephone, Internet enabled devices or appliance capable of delivering digital information and/or content, and any other similar device capable of unidirectionally or bidirectionally communicating content between content providers and platform 1002 and/display 1020, via network 1060 or directly. It will be appreciated that the content may be communicated unidirectionally and/or bidirectionally to and from any one of the components in system 1000 and a content provider via network 1060. Examples of content may include any media information including, for example, video, music, medical and gaming information, and so forth.

Content services device(s) 1030 receives content such as cable television programming including media information, digital information, and/or other content. Examples of content providers may include any cable or satellite television or radio or Internet content providers. The provided examples are not meant to limit the scope of this disclosure.

In some examples, platform 1002 may receive control signals from navigation controller 1050 having one or more navigation features. The navigation features of controller 1050 may be used to interact with user interface 1022, for example. According to some examples, navigation controller 1050 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1050 may be echoed on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In some examples, controller 1050 may not be a separate component but integrated into platform 1002 and/or display 1020. Although this disclosure is not limited to the elements or in the context shown for controller 1050.

According to some examples, drivers (not shown) may comprise technology to enable users to instantly turn on and off platform 1002 like a television with the touch of a button after initial boot-up, when enabled. Program logic may allow platform 1002 to stream content to media adaptors or other content services device(s) 1030 or content delivery device(s) 1040 when the platform is turned "off." In addition, chip set 1005 may include hardware and/or software support for 5.1 surround sound audio and/or high definition 7.1 surround sound audio, for example. Drivers may include a graphics driver for integrated graphics platforms. For some examples, the graphics driver may comprise a peripheral component interconnect (PCI) Express graphics card.

In various examples, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various examples, platform 1002 and display 1020 may be an integrated unit. Display 1020 and content service device(s) 1030 may be integrated, or display 1020 and content delivery device(s) 1040 may be integrated, for example. These examples are not meant to limit this disclosure.

In various examples, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The examples mentioned above, however, are not limited to the elements or in the context shown or described in FIG. 10.

Figure 11:
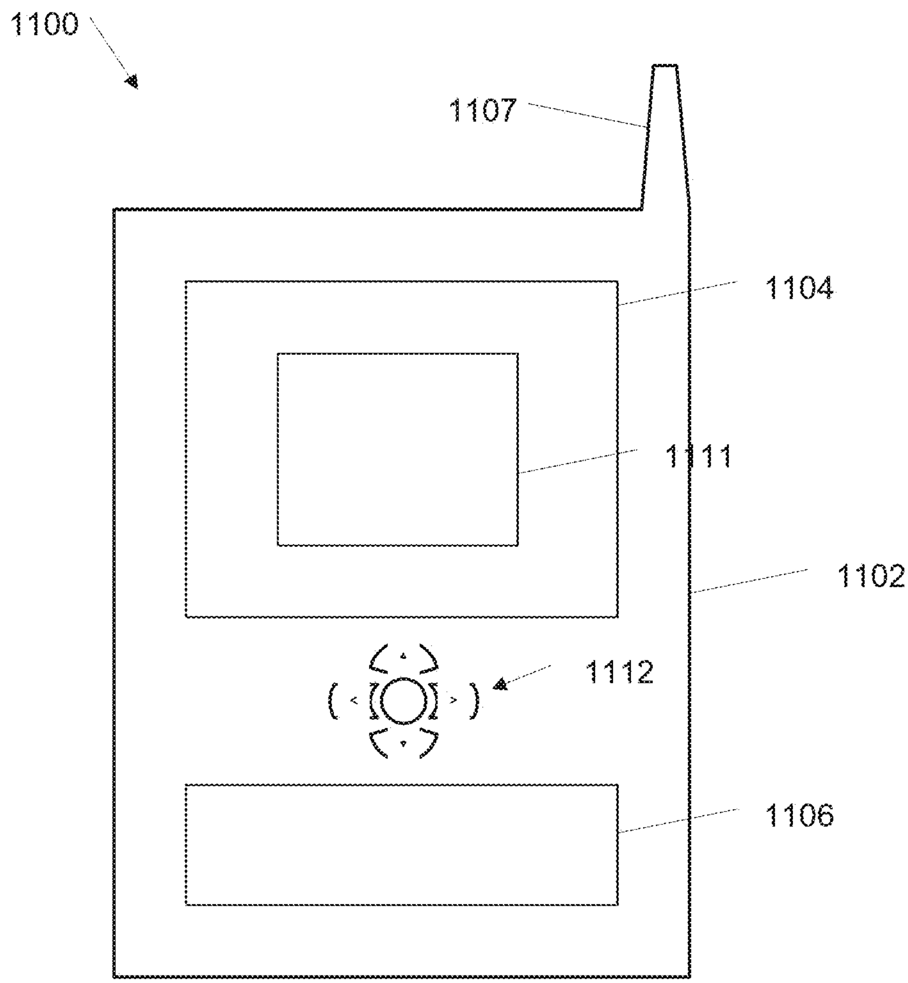
FIG. 11 illustrates an example device.

FIG. 11 illustrates an example device 1100. As described above, system 1000 may be embodied in varying physical styles or form factors. FIG. 11 illustrates examples of a small form factor device 1100 in which system 1000 may be embodied. In some examples, device 1100 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. According to some examples, a mobile computing device may be implemented as a smart phone capable of executing computer applications, as well as voice communications and/or data communications. Although some examples may be described with a mobile computing device implemented as a smart phone by way of example, it may be appreciated that other examples may be implemented using other wireless mobile computing devices as well. The examples are not limited in this context.

As shown in FIG. 11, device 1100 may include a housing 1102, a display 1104, an input/output (I/O) device 1106, and an antenna 1108. Device 1100 also may include navigation features 1112. Display 1104 may include any suitable display unit for displaying information appropriate for a mobile computing device. I/O device 1106 may include any suitable I/O device for entering information into a mobile computing device. Examples for I/O device 1106 may include an alphanumeric keyboard, a numeric keypad, a touch pad, input keys, buttons, switches, rocker switches, microphones, speakers, voice recognition device and software, and so forth. Information also may be entered into device 1100 by way of microphone. For some examples, a voice recognition device may digitize such information. Although the disclosure is not limited in this context.

Various examples may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture. An article of manufacture may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

According to some examples, an article of manufacture may include a non-transitory storage medium to store or maintain instructions that when executed by a computer or system, cause the computer or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a computer to perform a certain function. The instructions may be implemented using any suitable high-level, low-level, object-oriented, visual, compiled and/or interpreted programming language.

In some examples, operations described in this disclosure may also be at least partly implemented as instructions contained in or on an article of manufacture that includes a non-transitory computer-readable medium. For these examples, the non-transitory computer-readable medium may be read and executed by one or more processors to enable performance of the operations.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:

receiving, by a processor circuit, information identifying a plurality of areas of interest included in a display element to be displayed to an observer, each of the plurality of areas of interest including a tagged;

capturing, by a camera coupled to the processor circuit, eye movement of the observer's eyes as the display element is displayed;

gathering, by the processor circuit, eye tracking or gaze information, the eye tracking or gaze information based on the captured eye movement, the gathered eye tracking or gaze information to include at least one of separate gaze durations for each of the plurality of areas of interest and separate counts of gazes for each of the plurality of areas of interest, a gaze duration to include the observer's eyes directed to a given area of interest beyond a time threshold and a count of gazes to include a number of times the observer's eyes are directed at the given area of interest beyond the time threshold;

assigning, by the processor circuit, a first weight value to the separate gaze durations and a second weight value to the separate count of gazes, the first weight value greater than the second weight value;

determining, by the processor circuit, an interestingness score for each of the plurality of areas of interest based on the weighted separate gaze durations and the weighted separate count of gazes;

identifying, by the processor circuit, at least two of the plurality of areas of interest having a tagged object of a same type;

combining, by the processor circuit, the interestingness score for the at least two of the plurality of areas of interest having a tagged object of the same type into a combined interestingness score; and providing, by the processor circuit, the interestingness score for each of the plurality of areas of interest and the combined interestingness score to one of an application associated with an advertiser, an application associated with a social media Internet site, an application associated with storing or sharing digital photos or an application associated with storing or sharing motion video.

2. The method of claim 1, comprising the display element including one of a static image or a motion video.

3. The method of claim 1, comprising receiving information identifying the plurality of areas of interest from the one of the application associated with an advertiser, the application associated with a social media Internet site, the application associated with storing or sharing digital photos or the application associated with storing or sharing motion video.

4. The method of claim 1, the plurality of tagged objects to include at least one of an identified person, a type of person, a type of consumer product, a type of flora, a type of fauna, a type of structure, a type of landscape or a color.

5. The method of claim 1, comprising gathering the eye tracking or gaze information based on the observer providing permission to track the observer's eyes when observing the display element.

6. The method of claim 5, comprising enabling the observer to turn off one or more cameras associated with an eye tracking system based on denying permission to track the observer's eyes when observing the display element.

7. The method of claim 1, comprising the gathered eye tracking or gaze information to additionally include at least one of separate counts of fixations for each of the plurality of areas of interest or separate times to first fixation for each of the plurality of areas of interest.

8. The method of claim 7, comprising, a count of fixations to include a number of times the observer's eyes are directed at the given area of interestand a time to first fixation to include a difference in a time between when the display element was displayed to the observer and when the observer's eyes were first directed at the given area of interest.

9. The method of claim 1, comprising updating marketing information associated with the plurality of areas of interest based on the interestingness score.

10. An apparatus comprising:

a processor circuit;

a camera coupled to the processor circuit; and a memory unit communicatively coupled to the processor circuit, the memory unit arranged to store a interestingness manager operative on the processor circuit to:

receive information identifying a plurality of areas of interest included in a display element to be displayed to an observer, each of the plurality of areas of interest including a tagged object;

send a control signal to the camera to cause the camera to capture eye movement of the observer's eyes as the display element is displayed;

gather eye tracking or gaze information obtained based on the captured eye movement, the gathered eye tracking or gaze information to include at least one of separate gaze durations for each of the plurality of areas of interest and separate counts of gazes for each of the plurality of areas of interest, a gaze duration to include the observer's eyes directed to a given area of interest beyond a time threshold and a count of gazes to include a number of times the observer's eyes are directed at the given area of interest beyond the time threshold;

assign a first weight value to the separate gaze durations and a second weight value to the separate count of gazes, the first weight value greater than the second weight value;

determine an interestingness score for each of the plurality of areas of interest based on the weighted separate gaze durations and the weighted separate count of gazes;

identifying at least two of the plurality of areas of interest having a tagged object of a same type;

combining the interestingness score for at least two of the plurality of areas of interest having a tagged object of the same type into a combined interestingness score; and providing the interestingness score for each of the plurality of areas of interest and the combined interestingness score to one of an application associated with an advertiser, an application associated with a social media Internet site, an application associated with storing or sharing digital photos or an application associated with storing or sharing motion video.

11. The apparatus of claim 10, comprising a display for the observer to view the display element.

12. The apparatus of claim 10, comprising the display element including one of a static image or a motion video.

13. The apparatus of claim 10, comprising each of the plurality of areas of interest including one or more tagged objects, the plurality of tagged objects to include at least one of an identified person, a type of person, a type of consumer product, a type of flora, a type of fauna, a type of structure, a type of landscape or a color.

14. The apparatus of claim 10, comprising the interestingness manager configured to receive the information identifying the plurality of areas of interest from the one of the application associated with an advertiser, the application associated with a social media Internet site, the application associated with storing or sharing digital photos or the application associated with storing or sharing motion video.

15. The apparatus of claim 10, comprising the interestingness manager configured to gather eye tracking or gaze information to additionally include at least one of separate counts of fixations for each of the plurality of areas of interest or separate times to first fixation for each of the plurality of areas of interest.

16. An article of manufacture comprising a non-transitory storage medium containing instructions that when executed cause a system to:

receive information identifying a plurality of areas of interest included in a display element to be displayed to an observer, each of the plurality of areas of interest including a tagged object;

send a control signal to a camera to cause the camera to capture eye movement of the observer's eyes as the display element is displayed;

gather eye tracking or gaze information obtained based on the captured eye movement, the gathered eye tracking or gaze information to include at least one of separate gaze durations for each of the plurality of areas of interest and separate counts of gazes for each of the plurality of areas of interest, a gaze duration to include the observer's eyes directed to a given area of interest beyond a time threshold and a count of gazes to include a number of times the observer's eyes are directed at the given area of interest beyond the time threshold;

assign a first weight value to the separate gaze durations and a second weight value to the separate count of gazes, the first weight value greater than the second weight value;

determine an interestingness score for each of the plurality of areas of interest based on the weighted separate gaze durations and the weighted separate count of gazes;

identifying at least two of the plurality of areas of interest having a tagged object of a same type;

combine the interestingness score for at least two of the plurality of areas of interest having a tagged object of the same type into a combined interestingness score; and provide the interestingness score for each of the plurality of areas of interest and the combined interestingness score to one of an application associated with an advertiser, an application associated with a social media Internet site, an application associated with storing or sharing digital photos or an application associated with storing or sharing motion video.

17. The article of manufacture of claim 16, comprising the instructions to cause the system to receive the information identifying the plurality of areas of interest from the one of the application associated with an advertiser, the application associated with a social media Internet site, the application associated with storing or sharing digital photos or the application associated with storing or sharing motion video.

18. The article of manufacture of claim 17, comprising the gathered eye tracking or gaze information to include at least one of separate counts of fixations for each of the plurality of areas of interest or separate times to first fixation for each of the plurality of areas of interest.

19. The article of manufacture of claim 18, comprising a count of fixations to include a number of times the observer's eyes are directed at the given area of interest and a time to first fixation to include a difference in a time between when the display element was displayed to the observer and when the observer's eyes were first directed at the given area of interest.

* * * * *